United States Patent [19]
Cowan, Sr.

[11] Patent Number: 5,428,954
[45] Date of Patent: Jul. 4, 1995

[54] SYSTEM FOR SUPPRESSING ENGINE EXHAUST NOISE

[76] Inventor: Howard H. Cowan, Sr., 3315 N. Godfrey #36, Midland, Tex. 79707

[21] Appl. No.: 225,706

[22] Filed: Apr. 11, 1994

[51] Int. Cl.⁶ ............................................. F02K 1/46
[52] U.S. Cl. ........................................ 60/262; 60/264; 60/271
[58] Field of Search ............... 60/262, 226.1, 263, 60/264, 271; 181/220, 221; 239/265.17

[56] References Cited

U.S. PATENT DOCUMENTS

| | | | |
|---|---|---|---|
| 2,799,990 | 7/1957 | Hausmann | 239/265.17 |
| 2,990,905 | 7/1961 | Lilley | 181/220 |
| 3,442,350 | 5/1969 | O'Brien | 181/221 |
| 3,463,402 | 8/1969 | Langszon, Jr. | 239/265.13 |
| 3,599,749 | 8/1971 | Millman | 239/265.17 |
| 3,618,701 | 11/1971 | MacDonald | 181/221 |
| 3,726,091 | 4/1973 | Tontini | 239/265.17 |
| 3,987,621 | 10/1976 | Sabatella, Jr. | 60/204 |
| 4,175,640 | 11/1979 | Birch et al. | 60/262 |
| 4,474,259 | 10/1984 | Wright | 60/262 |
| 4,909,346 | 3/1990 | Torrelson | 181/213 |
| 4,934,481 | 6/1990 | Friedrich | 181/220 |
| 4,979,587 | 12/1990 | Hirt et al. | 181/213 |
| 5,092,425 | 3/1992 | Shaw, Jr. | 181/220 |
| 5,154,052 | 10/1992 | Giffin | 60/262 |
| 5,216,878 | 6/1993 | Klees | 60/204 |

Primary Examiner—Timothy S. Thorpe
Attorney, Agent, or Firm—Fred N. Schwend

[57] ABSTRACT

An engine exhaust noise suppression system comprising a plurality of bypass ports surrounding the exhaust tailpipe and opening to the atmosphere to create streams of cool air which generate vortices effective to dampen the exhaust noise vibrations and to contain the same as they dissipate into the atmosphere. Fluid is injected into the air streams to enhance the vorticular action thereof by applying a helical swirling motion to the streams.

10 Claims, 2 Drawing Sheets

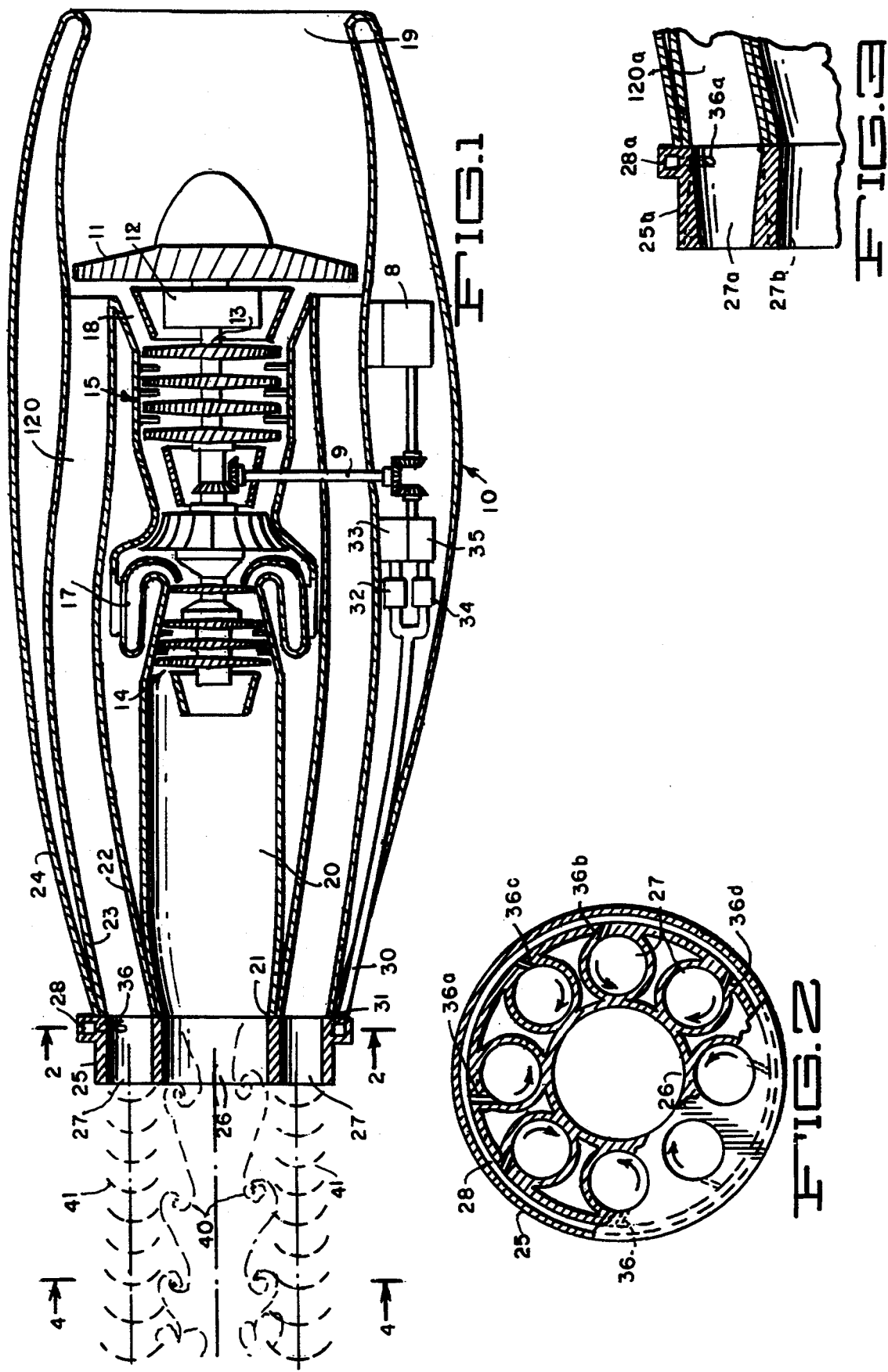

SYSTEM FOR SUPPRESSING ENGINE EXHAUST NOISE

BACKGROUND OF THE INVENTION

1. Field of the Invention

This invention relates to a system for reducing the noise created by internal combustion engines and has particular reference to a system for suppressing the noise created by an aircraft gas turbine engine, and for otherwise enhancing the operation of such engines.

2. Description of the Prior Art

It is statistically known that approximately 95% of the undesirable noise occurring at large airports in the U.S. and foreign countries is due to gas turbine driven, multi-engine aircraft while on the ground or on take-off or on landing.

For many years engine and aircraft manufacturers, along with government agencies, have been actively engaged in attempting to reduce the noise level of such aircraft engines. Generally, the noise is due to the high velocity at which the exhaust gases exit the exhaust nozzle, producing sound waves which radiate in all directions.

This problem has not yet been wholly solved and various municipalities throughout the United States and foreign countries have enacted laws in an attempt to reduce airport noise.

As examples of the prior attempts to reduce engine noise, particularly in aircraft engines, reference may be had to the following U.S. Pat. No. 3,463,402 issued to C. E. Langston, Jr.; U.S. Pat. No. 3,987,621 issued to J. Sabatelli et al; U.S. Pat. No. 4,909,346 issued to D. W. Torkelson; U.S. Pat. No. 4,979,587 issued to W. J. Hirt et al; U.S. Pat. No. 5,154,052 issued to R. G. Griffen et al ; and U.S. Pat. No. 5,216,878 issued to A. W. Klees.

In many of such prior systems, an annular stream of bypass air is passed over the engine and mixed with the exhaust gases before the latter emerge from the exhaust nozzle. This mixing results in a certain amount of noise attenuation due to the turbulence and breaking up of the noise waves before emergence. Although this may reduce the velocity of the exhaust gases with consequent reduction in noise, it also tends to reduce thrust.

In other systems, as noted in the published book "Aircraft Power Plants", fourth edition, by Ralph D. Bent and James L. McKinley, pages 422 and 423, the exhaust gas stream is divided into a number of smaller streams or is so formed to increase the noise frequencies so that they are more highly and quickly attenuated by atmospheric absorption. However such solutions leave much to be desired in reducing exhaust noise to an acceptable level. Also, most such prior attempts to attenuate noise tend to reduce engine power, particularly when most needed, i.e. at take-off, etc.

It therefore becomes a principal object of the present invention to reduce the noise level of engine exhaust gases emitted from an internal combustion engine.

Another object of the invention is to reduce the noise level of the engine without reducing engine power.

Another object is to selectively increase engine power when needed.

Another object is to utilize vortices generated by streams of cooling air to contain and attenuate engine exhaust noises.

A further object is to provide a simple and inexpensive system for reducing the noise level of engine exhaust noises.

Another object is to reduce the noise level and to use the noise energy for added thrust.

SUMMARY OF THE INVENTION

It has long been known that fluid streams can develop certain vortices as the streams pass through static or even relatively moving fluid medium. Such vortices or wave motions may take the form of vortex rings, such as mmay be observed when a smoker blows smoke rings in the air. They may also take the form of helical or spiral vortices, known as the "Coriolis effect" which may be seen when water is drained from a bathtub and through a drain pipe. Other, more complex vortex forms may also be developed when a fluid is directed into a fluid medium. Such vortices tend to exist for an appreciable lenth of time after generation as may be observed in aircraft vapor trails, whirlpools, tornados, and the like.

I have discovered that relatively cold bypass air streams, in which vortices are developed, when arranged in a pattern around a stream of hot exhaust gases, are effective to substantially contain the noise vibrations in the exhaust stream within the pattern and to gradually break up and attenuate such vibrations.

In order to produce such attenuation without loss of propulsion, ports carrying the cold air bypass streams open into the atmosphere outside the terminal end of the exhaust gas nozzle or conduit so that the vortices produced in such bypass streams are not affected by the exhaust gases until they intermingle after the exhaust gases leave the exhaust gas nozzle or conduit. Also, the ports are arranged in a regularly spaced circular pattern around the exhaust outlet so that the vortices developed in the bypass air streams interlock and intermesh with each other to totally surround the stream of exhaust gases. In practice, I have found that such streams should be optimally eight or more in number and of an even number.

Water or other cooling fluid is preferably injected into the bypass air stresms in a manner to develop helical vortices which interlock and intermesh with each other to present an annular surrounding wall of air of a different density than that of the hot exhaust gases. Thus the noise vibrations tend to be reflected back and forth within such annular wall. At the same time, the helical swirling of the bypass air atreams tend to break up the noise vibrations so that they will more readily dissipate in the atmosphere.

Further, as the moisture in the bypass air streams engages the hot exhaust gases, it will rapidly turn to steam and due to the resulting expansion it will provide additional thrust.

BRIEF DESCRRIPTION OF THE DRAWINGS

The manner in which the above and other objects of the invention are accomplished will be readily understood on reference to the following specification when read in conjunction with the accompanying drawings, wherein;

FIG. 1 is a longitudinal sectional view through a turbofan type aircraft engine embodying a preferred form of the present invention.

FIG. 2 is a transverse sectional view taken along line 2—2 of FIG. 1.

FIG. 3 is a fragmentary sectional view showing a modified form of the invention.

DESCRIPTION OF THE PREFERRED EMBODIEMENT

Figure 4:
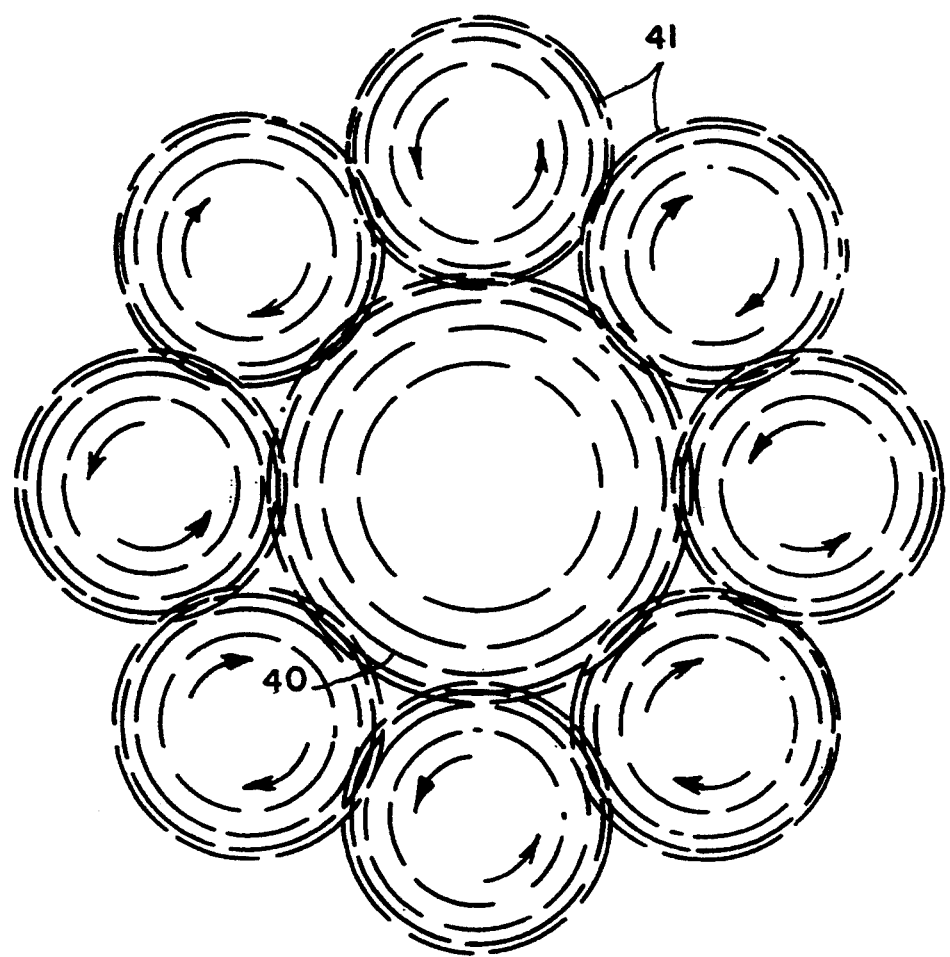
FIG. 4 is a transverse sectional view taken along line 4—4 of FIG. 1, illustrating schematically the interlocking and intermeshing votex patterns developed by the bypass air streams.

Referring in particular to FIGS. 1, 2 and 4, the invention is illustrated as embodied in an aircraft turbofan type engine generally indicated at 10, comprising a fan 11 driven through a gear transmission 12 by a shaft 13 on which a turbine unit 14 and a compressor unit 15 is mounted. The shaft 13 also drives an engine accessory unit 8 through a gear and shaft train 9.

Combustion chambers 17 burn a fuel mixture compressed by the compressor unit 15, which expands to drive the turbine unit 14, along with the compressor unit 15 and fan 11. The resultant exhaust gases are expelled rearwardly througha tail pipe 20 and exhaust nozzle 21 to develop forward thrust.

The fan 11 forces a portion of the incoming air through ducts 18 into the compressor unit 15. However, a major portion is directed rearwardly through an annular bypass duct 120 surrounding the engine core. Typically the duct ratio is on the order of 5:1 with about 80% of the incoming air being forced through the annular duct 120.

According to the present invention, the inner wall 22 of the duct 120 terminates in the plane of the exhaust nozzle and lies directly thereagainst. The outer wall 23 of the duct 120 also terminates in the plane of the nozzle 21 and mates with a streamlined engine nacelle or pod 24 which forms at its forward end an air intake for the engine. Suitable means (not shown) are provided to mount the nacelle and engine on the aircraft.

A one piece tail member 25 of temperature resistant material is secured, as by welding, to the rear end of the tail pipe 20 and the walls 22 and 23 of the duct 120. Such member has a cylindrical opening 26 aligned with the exhaust nozzle 21. Surrounding the opening 26 is a pattern of equi-spaced openings or ports 27 opening into the annular duct 120. An annular passage 28 is formed in the member 25 around its periphery to receive fluid under pressure. For this purpose, a fluid conduit 30 opens at one end at 31 into the passage 28 and at its opposite end it branches out to be connected by a valve 32 to a source 33 of water or other cooling fluid and by a valve 34 to a source 35 of liquid fuel. The sources 34 and 35 include pump means driven by the gear and shaft train 9.

It will be noted in FIG. 2 that jet orfices 36 extend in the member 25 from the passage 28 and open tangentially into the various ports 27. As viewed in FIG. 2, alternate ones of the orfices 36, such as orifices 36a and 36b, are arranged to cause a counterclockwise circulation of atomized fluid into the respective ports 27, while intermeadiate orfices, such as orifices 36c and 36d, are arranged to cause clockwise circulation of atomized fluid into their respective ports 27.

In operation, the hot exhaust gases depicted schematically at 40, pass through the exhaust nozzle 21 and opening 26, generating noise vibrations which spread outwardly. Concurrently, cool bypass air is forced rearwardly through the annular duct 120 by the fan 11 and is divided into eight individual air streams by the ports 27 to extend substantially parallel with the exhaust gas stream.

Normally, the valve 32, preferably under control of the aircraft pilot, is opened, enabling water or other cooling fluid to be injected into the various ports 27, causing a helical swirling of the bypass air streams as they pass through the ports. This gives rise to helically formed vortices, as depicted schematically at 41 in FIG. 4.

As seen particularly in FIG. 4, as the vortices 41 gradually expand, they interlock and intermesh with each other to form an annular acoustic barrier wall surrounding the exhaust stream 40. Due to their swirling motion, the vortices tend to break up the noise vibrations of the exhaust gases. Also, particularly since the vortices are formed of cool damp air, they form an interface with the hot exhaust gases so that the noise vibrations emanating from the exhaust gases tend to bounce back and forth within the annular wall formed the surrounding vortices.

Further, as the damp bypass air streams intermingle with the hot exhaust stream, the atomized water particles tend to quickly expand into steam vapor and since such expansion is of a high order, it tends to develop additional forward thrust.

In emergencies or other cases where maximum thrust is required, the pilot may close the valve 32 and open valve 34, enabling liquid fuel to be injected into the ports 27 . In this case, the fuel-air mixture passing through the ports in the aforesaid swirling manner will be ignited by the exhaust gases, resulting in increased thrust.

Although the invention is described as applied to a turbofan type aircraft engine, it should be understood that at least certain aspects of the invention may equally well be applied to other types of internal combustuion engines.

DESCRIPTION OF THE MODIFIED FORM OF FIG. 4

FIG. 4 illustrates a modified form of tail member, i.e. 25a. Here, the ports 27a are conically shaped to converge toward the rear surface of the member 25a to increase the velocity of the emerging swirls of bypass air streams. However, the amount of tapering may be varied, or even reversed as indicated by dotted lines 27b, as required to obtain maximum perfornace of the engine.

DESCRIPTION OF THE MODIFIED FORM OF FIGS. 5 AND 6

Figures 5, 6:
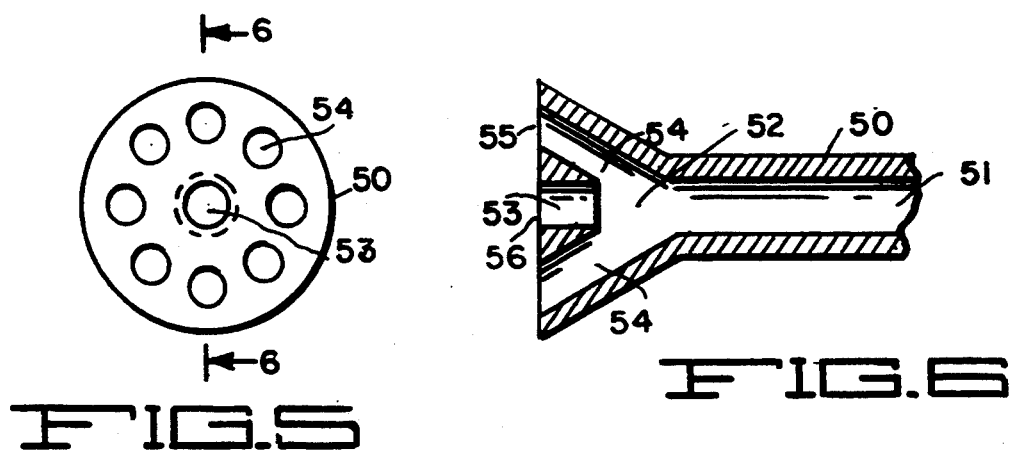
FIG. 5 is an end view of a modified form of the invention.
FIG. 6 is a longitudinal sectional view taken along line 6—6 of FIG. 5.

FIGS. 5 and 6 illustrate a modified form in which an exhaust receiver 50 is arranged to receive engine exhaust gases through an exhaust passage 51. The latter opens into a chamber 52. A second passage 53, coaxial with passage 51, and having a diameter somewhat smaller than the diameter of the latter, conveys the exhaust gases from the chamber 52 to the atmosphere. A series of divergent passages 54 having diameters substantially the same as passage 53 also open into the chamber 52.

It will be noted that the exit openings of passages 54 are coplanar with the exit opening 56 of passage 53. As the divergent columns of gases pass through the passages 54 and into the atmosphere, they create vortices which eventually interlock and intermix with noise vibrations emanating from the main stream exiting from the exhaust passage 53 to contain the latter within the cone of vortices and thus enable such vibrations to dissipate within such cone.

I claim:

1. An exhaust noise suppression system for an internal combustion engine having an exhaust conduit open at one end to the atmosphere for discharging a stream of exhaust gases along a primary axis,
which comprises
means forming a plurality of ports equally spaced from each other around said conduit for conveying streams of air along respective secondary axes extending parallel to said primary axis,
said ports each having an exhaust end terminating in a plane at least substantially coincident with said end of said conduit,
said ports being equal in number, and
means for rotating adjacent ones of said air streams in opposite directions about said secondary axes whereby to cause said adjacent air streams to intermesh with each other in the same direction to form an acoustic barrier of vortices surrounding said exhaust gas stream.

2. A system as defined in claim 1 wherein said ports are at least eight in number.

3. A system as defined in claim 1 wherein said rotating means comprises means for injecting cooling fluid into said ports whereby to increase the density of said air streams.

4. A system as defined in claim 1 wherein said rotating means comprises means for injecting water into said ports whereby to increase the density of said air streams.

5. A system as defined in claim 1 wherein said rotating means comprises means for injecting a fluid fuel into said ports whereby to form an explosive mixture.

6. A system as defined in claim 1 wherein said ports have cylindrical inner surfaces, and
wherein said said rotating means comprises means for injecting a fluid into said ports and tangentially onto said inner surfaces whereby to rotate said air streams about respective ones of said secondary axes.

7. A system as defined in claim 1 wherein said ports have conical inner surfaces, and
wherein said rotating means comprises means for injecting a fluid into said ports and tangentially onto said inner surfaces whereby to rotate said air streams about respective ones of said secondary axes.

8. A system as defined in claim 5 wherein said injecting means comprises a source of water under pressure, a source of fluid fuel under pressure, and
means for selectively connecting either of said sources to said orifices.

9. An exhaust noise suppression system for an internal combustion engine having an exhaust conduit open at one end to the atmosphere for discharging exhaust gases along a primary axis,
which comprises
a one-piece annular tail member mounted at said end of said conduit,
said tail member having an opening therethrough to transmit said gases to the atmosphere,
said tail member having a plurality of ports spaced around said opening,
said ports having cylindrical inner surfaces concentric with respective secondary axes extending parallel to said primary axis,
means for forcing air through said ports and along said secondary axes,
a passage in said tail member,
orifices in said tail member opening into said ports,
said orifices extending tangentially of said inner surfaces and communicating with said passage, and
means for directing cooling fluid through said passage and said orifices whereby to rotate said streams about said secondary axes to form an annular acoustic barrier surrounding said exhaust gases.

10. A system as defined in claim 9 wherein certain of said orifices are arranged to direct said fluid in one direction and intermediate ones of said orifices are arranged to direct said fluid in an opposite direction.

* * * * *